United States Patent [19]

Frimml et al.

[11] 4,446,684
[45] May 8, 1984

[54] CYLINDRICAL BALER WITH FLARE SHEETS ON CROP PICKUP

[75] Inventors: Roger W. Frimml; Gerald F. Meiers, both of Ottumwa, Iowa

[73] Assignee: Deere & Company, Moline, Ill.

[21] Appl. No.: 382,887

[22] Filed: May 28, 1982

[51] Int. Cl.³ .............................................. A01D 89/00
[52] U.S. Cl. ......................................... 56/341; 56/364
[58] Field of Search ................... 56/341, 344, 364, 343

[56] References Cited

U.S. PATENT DOCUMENTS 3,798,885  3/1974  Glass et al. ............................ 56/364

Primary Examiner—J. N. Eskovitz

[57] ABSTRACT

A baler for forming cylindrical bales is comprised of a bale forming chamber having a downwardly facing opening. A pickup is pivotably mounted to the frame of the baler for movement through a range of vertical positions, and transversely extends between the sidewalls of the baler below the opening. Flare sheets are mounted on each side of the pickup for aiding in feeding and guiding of crop into the bale forming chamber by the pickup. The pickup is mounted pivotably to the frame of the baler adjacent to the rear of the opening. Each flare sheet is mounted to the frame of the baler adjacent to the front of the opening in a guide slot which permits the flare sheet to be pivotably and slidably moved back and forth therein. The flare sheets and the pickup are mounted together for conjoint movement through the range of positions by mounting each flare sheet at respective ends of the pickup reel. When the pickup and flare sheets are moved from an elevated position to a lowered position; the flare sheets are pivotally and rearwardly moved in the guide slot, the pickup is pivotally moved downwardly toward the ground, and the flare sheets and pickup together are moved downwardly about their common pivot spaced midway between the forward pivot of the flare sheet to the frame and the rearward pivot of the pickup to the frame.

7 Claims, 4 Drawing Figures

CYLINDRICAL BALER WITH FLARE SHEETS ON CROP PICKUP

BACKGROUND OF THE INVENTION

This invention relates to balers for producing cylindrical ("round") bales, and more particularly relates to flare sheets for use with the crop pickup of such balers. Flare sheets are used to prevent light crops from being blown away by crosswinds and to contain hard to feed crop therebetween until the reel teeth 103 are able to lift the crop and feed it into the bale forming chamber 29.

Prior art balers such as disclosed in U.S. Pat. Nos. 4,182,101, and 4,252,057 comprise generally a plurality of side-by-side belts supported on a plurality of rollers. A bale forming chamber is defined by the sides of the balers, the rollers and the belts. An opening or throat into the chamber (when in an empty condition) is defined by the lower extremities of front and rear spans of the belts. The throat is located on the front underside of the baler. In the prior art balers disclosed in the aforementioned U.S. patents, there is a limited clearance underneath the baler for the location of the crop pickup and a cooperative flare sheet on each end of the pickup. The crop pickup is pivoted adjacent the front of the throat and extends rearwardly from the pivot underneath the throat of the chamber. A flare sheet is mounted on each end of the pickup and is vertically adjustable therewith over a limited range of heights for crop pickup and baler transport. This design suffers from the disadvantages that (1) the distance between the dump point of the pickup tines and the rear belt span defining the rear portion of the throat varies when the pickup is adjusted to different heights and (2) because of the throat construction, there is a limited amount of space available to elevate the pickup underneath the baler for transport and for height adjustment. Adjustment of pickup height is desirable to permit the pickup to be located at an optimum height above the ground based on field and crop conditions.

SUMMARY OF THE INVENTION

Accordingly, it is an object of this invention to provide a baler having (1) a chamber opening generally downwardly and underneath the frame of the baler, (2) a pickup pivoted adjacent to the rear of the chamber opening for maintaining uniform distance between the release point of the pickup tines and the rear of the chamber opening and (3) flare sheets conjointly movable with a pickup between an elevated and a lowered position.

A further object of the invention is to provide flare sheets which clear all structural and moving components underneath the baler when the pickup and flare sheets are moved back and forth between an elevated and a lowered position.

Still a further object of the invention is that the elevated position of the pickup and flare sheets provide substantial clearance above the ground to prevent damage to the pickup during transport of the baler.

These and other objects of the invention are accomplished by providing a cylindrical baler comprising a means for defining a bale forming chamber having a downwardly facing opening. A pickup is pivotably movable for movement through a range of vertical positions, transversely extends between the sidewalls of the baler and extends below the opening. First and second flare sheets are mounted on respective ends of the pickup for aiding in the feeding of crop material into the chamber opening. In accordance with the improvement of this invention means are provided for (1) mounting the pickup to the baler frame adjacent to the rear of the opening (2) mounting each flare sheet to the frame adjacent to the front of the opening and (3) mounting the flare sheets and the pickup together for conjoint movement.

In accordance with a preferred embodiment, the mounting means for each of the flare sheets comprises (1) a slide fixed to the frame and having a slot formed therein and (2) a guide fixed to the flare sheet and slidably and pivotably mounted in the slot. The mounting means further comprises a pickup pivot fixed to the frame adjacent to the rear of the opening and coaxial with a lower rear belt supporting roller defining the lower extremities of the rear belt span of the chamber opening, and a flare sheet pivot fixed to the pickup and pivotably supporting one end of the sheet for conjoint movement with the pickup between the elevated and the lowered positions. By having the pickup pivoted about pivot coaxial with the lower rear roller, the distance between the release point of the pickup tines and a belt guide roller at the rear of the throat is constant with adjustment of the pickup to different heights. Furthermore, when the pickup and flare sheets are conjointly moved between lowered and an elevated positions, the flare sheets move upwardly and forwardly in a manner which permits (1) clearance from other components of the baler, (2) a wide range of height adjustment, and (3) substantial clearance of the pickup above the ground in the elevated position for transport of the baler without risk of damage to the pickup.

DESCRIPTION OF THE PREFERRED EMBODIMENT

I. General

Figure 1:
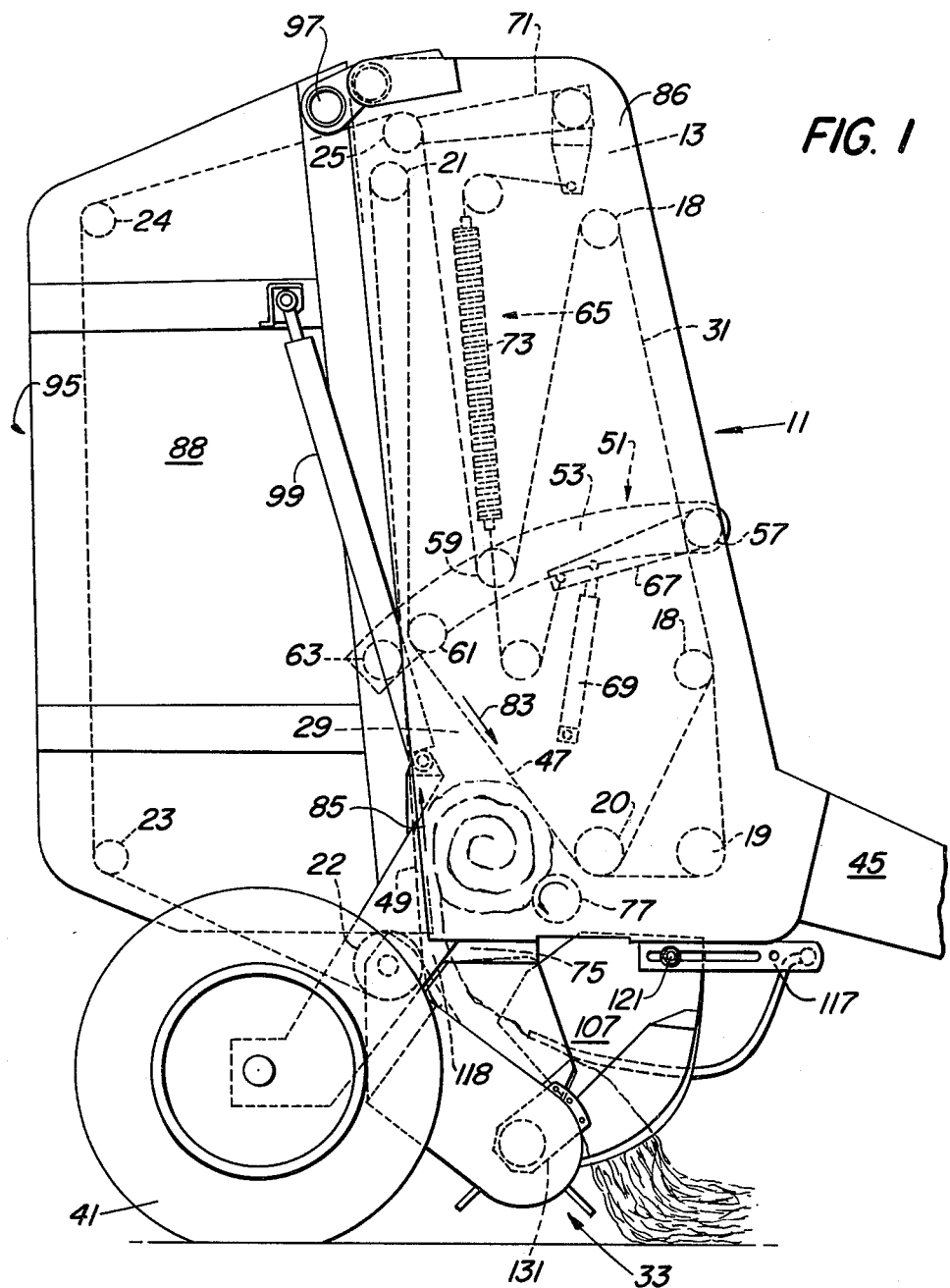
FIG. 1 is a side elevational view of a baler in accordance with the features of this invention.

Reference is now made to FIG. 1 which shows a preferred embodiment of an illustrative baler for the practice of this invention.

The baler is generally comprised of a frame 11 with a pair of opposed sidewalls 13, 15; a plurality of guide rollers 18–25, rotably mounted and extending between sidewalls 13, 15; a plurality of endless side-by-side belts 31 supported on guide rollers 18–25 and defining between sidewalls 13, 15 an expandable bale forming chamber 29 for forming cylindrical bales; and a crop pickup 33 for feeding crop material from the ground into bale forming chamber 29. The baler frame 11 is supported on wheels 41, 43 and is drawn behind a tractor (not shown) via a draft tongue 45.

Belts 31 include a pair of generally upwardly and vertically opposed spans or segments 47, 49 which form chamber 29 and extend between a roller 61 and roller 20 and between a roller 63 and a roller 22, respectively. The size of chamber 29 and the length of spans 47, 49 are adjustable to accommodate the increasing diameter of a bale during formation by a belt takeup and tensioning mechanism 51. Belt takeup and tensioning mechanism 51 is fully disclosed in U.S. patent application Ser. No. 308,223, filed Oct. 5, 1981 in the name of Koning et al and assigned to the assignee of the invention herein. Mechanism 51 forms no part of the invention herein and will only be briefly described for convenience. Mechanism 51 includes a pair of arms (only one shown) 53 pivotably mounted on a support 57, a takeup and tensioning roller 59 supported between arms 53 and the other arm (not shown) adjacent sidewall 15 and a pair of chamber restricting rollers 61, 63 supported between arms 53. Takeup and tensioning mechanism 51 is biased in a counterclockwise direction by a pair of bias mechanisms 65 on each side of the baler (only one shown) including bias arm 67 fixed to one end of support 57, hydraulic cylinder 69, bell crank 71 and a spring 73 interconnected between crank 71 and bias arm 67.

Crop material is fed into bale forming chamber 29 through an open or unrestricted entrance 75 without substantial compaction by pickup 29. Entrance 75 is defined by lower most opposed belt guide rollers 20, 22; crop pickup 33 and a stripper roller 77. Stripper roller 77 aids in the initiation of a bale core, partially crop material from belt segment 47 to prevent the loss of crop from chamber 29.

Belts 31 are driven in the direction of arrows 83, 85 by driving drive roller 20 through a conventional drive train (not shown) connected to the power takeup off shaft of the tractor (not shown) used to pull the baler. As described in U.S. patent application Ser. No. 285,178, filed July 20, 1981 in the name of Viaud, entitled STAGGERED ROLLS AND BELTS FOR ROUND BALER, and assigned to the assignee of the invention herein, belts 31 are arranged in a staggered manner on guide rollers 19, 20 to form openings or spaces through which crop material may escape before causing roll wrapping or buildup of trapped crop material within volumes such as volume 87, contiguous with bale forming chamber 29. The staggered belts and rollers feature forms no part of the invention herein and has therefore been only briefly described.

Each side sheet 13, 15 is comprised of front sections 86, 87 and rear sections (only one shown) 88. Rear sections 88 and rollers 22-24 constitute a bale discharge gate 95. Gate 95 is pivotably movable relative to front sections 86, 87 about a pivot 97 by actuation of a pair of hydraulic cylinders, (only one shown) 99 for ejection of a bale (when completed) from chamber 29.

II. General Operation of Baler

In operation of the baler generally, a bale is formed in the baler by pulling the baler through a field with a tractor. Crop material is picked up by a windrow on the ground by the crop pickup 33 and is fed upwardly without substantial compaction through entrance or throat 75 into chamber 29. The crop material is engaged with upwardly moving belt segment 49 and begins to turn in a clockwise direction where it is engaged by downwardly moving belt segment 47. When the crop material reaches the lower most portion of belt segment 47, it is engaged by stripper roller 77 rotating counterclockwise. Roller 77 tends to continue the rotation of crop material in a counterclockwise direction and into engagement with additional crop material being fed into chamber 29 through opening 75, thereby initiating formation of a bale core. As the bale core is formed, it becomes compacted by the tension in the belts until the tension in the belt imposed by belt tensioning mechanism 51 and bias mechanism 65 is exceeded; and arms 53, 55 along with rollers 59, 61, 63 are pushed in a counterclockwise direction. With the upward movement of rollers 59, 61, 63 belt segments 47, 49 are lengthened thereby increasing the diameter of the chamber 37. Size of bale forming chamber 29 continues to increase as the diameter of the bale increases and overcomes the tension imposed on the belts by spring 73 and cylinders 69. The tension on belts 31 is also adjustable to control bale density by the exchange of fluid between the upper and lower ends of cylinder 69 via an adjustable relief valve (not shown). When a bale reaches a predetermined diameter, cylinders 95 are actuated to open the bale discharge gate 95 to drop a bale on the ground.

III. Pickup and Flare Sheets

Figure 2:
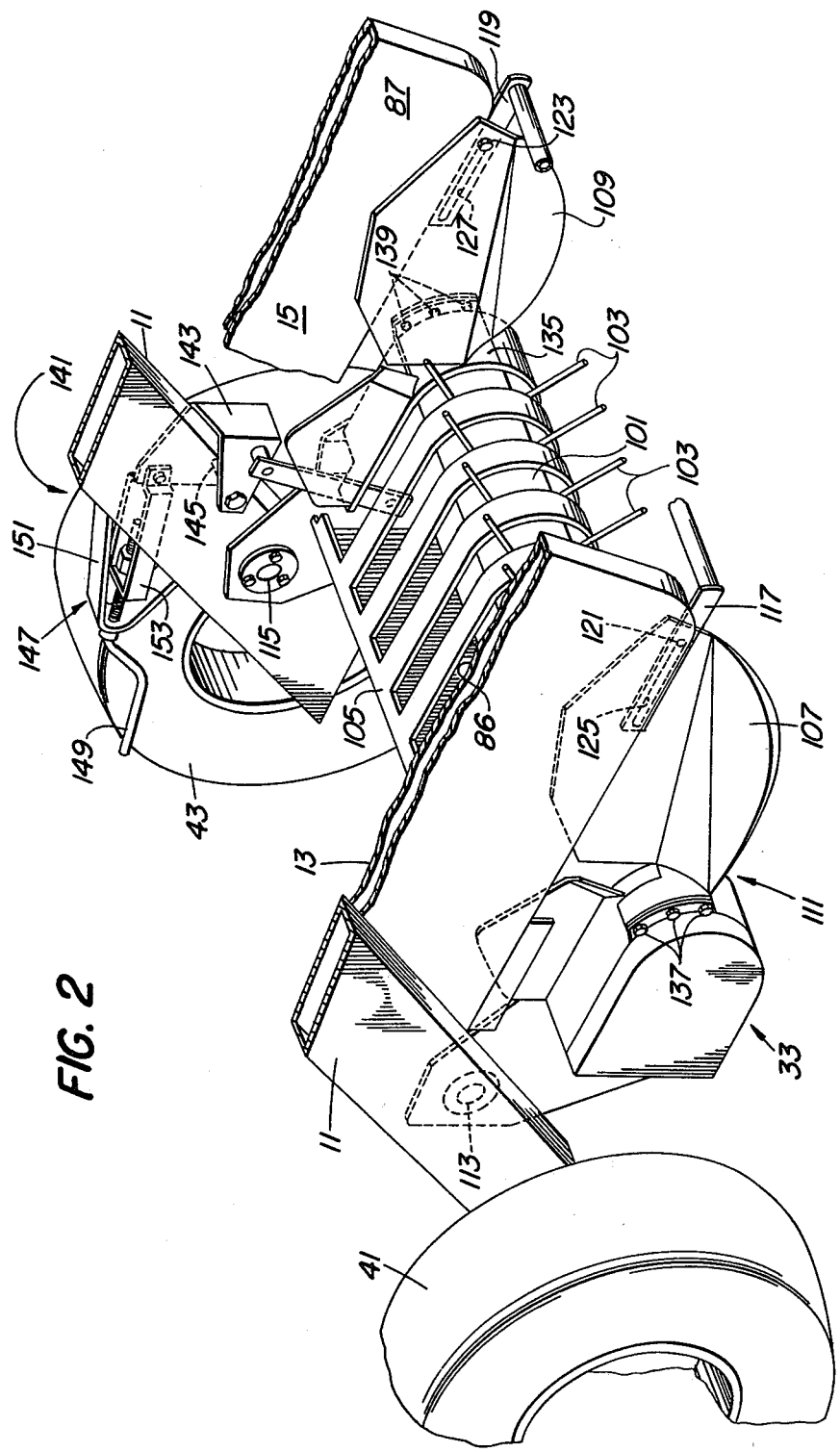
FIG. 2 is a fragmentary perspective view showing the crop pickup and flare sheets of the baler shown in FIG. 1.
Figure 3:
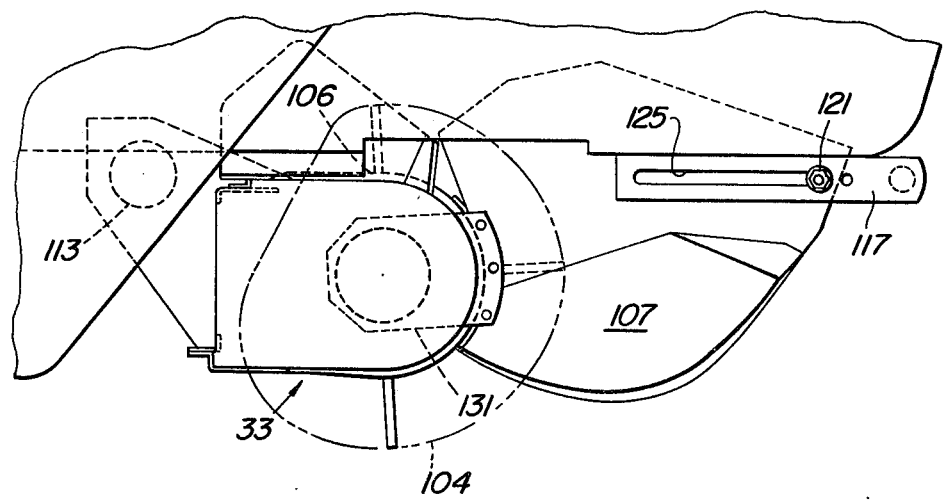
FIG. 3 is a fragmentary side elevational view of the baler of FIG. 1 with the crop pickup and flare sheets shown in an elevated position.
Figure 4:
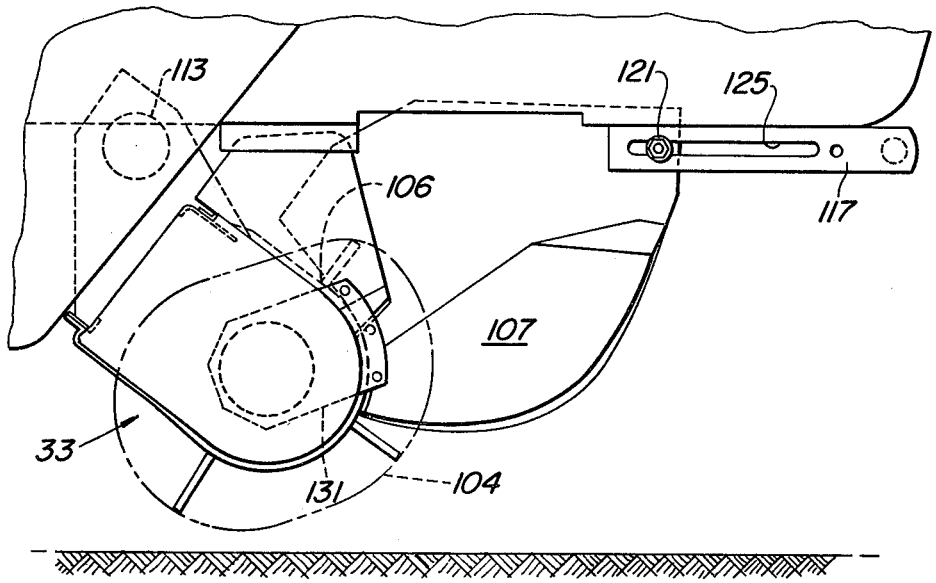
FIG. 4 is a side elevational view of the baler of FIG. 1 with the crop pickup and flare sheets shown in a lowered position.

Reference is now made to FIGS. 2-4 which illustrate a preferred embodiment of the invention. Pickup 33 is pivotably mounted to frame 11 for movement through a range of positions between an elevated position (FIG. 3) and a lowered position (FIG. 4) and extends transversely between sidewalls 13, 15 and below opening 75. Pickup 33 includes a conventional reel 101 having a plurality of teeth 103 extending therefrom through a stripper housing 105 for enclosing reel 101. The tips of teeth 103 are movable through a path 104 and define a crop release location 106. A first and second flare sheets 107, 109 are mounted on the respective end of pickup 33.

In accordance with the primary features of the improvement of this invention, means 111 are provided for (1) mounting pickup 33 to frame 11 adjacent to the rear of opening 75, (2) mounting each flare sheet 107, 109 to frame 11 adjacent to front of opening 75 and (3) mounting flare sheets 107, 109 and pickup 33 together for conjoint movement over a range of heights or vertical positions. It will be appreciated by those skilled in the art that mounting means 111 maybe specifically comprised by a variety of structures. In accordance with the preferred embodiment illustrated herein, mounting means 111 comprises a first and second pivots 113, 115 for pivotably mounting pickup 33 to a location adjacent the rear of opening 75. The axis of pivots 113, 115 is coaxial with the lower gate roller 22 which defines the rear periphery of opening 75. By pivotably mounting pickup 33 about an axis coaxial with roller 22, it is apparent that the reel 101 and the crop release location 106 thereof remains a constant distance from roller 22 with movement of the pickup 33 between lowered and elevated positions. This is important to provide good, uniform feeding of crop material into the bale forming chamber. This maybe appreciated from the fact that a pinch point 118 which is formed between roller 22 and a cylindrical bale being formed in chamber 29 is the point to which crop material must be initially fed for enwrapping about a bale during formation. Adjustment of the pickup and flare sheet height is desirable to optimize their location relative to the ground and windrow based on crop and field construction. The fully elevated position of pickup 33 and flare sheets 107, 109 corresponds to a position used for transport of the baler.

For mounting each flare sheet 107, 109 adjacent to the front of opening 75, mounting means 111 further comprises a pair of slides 117, 119 and a pair of guides 121, 123 fixed respectively to flare sheets 107, 109 and slidably and pivotably mounted in slots 125, 127 respectively of guides 117, 119 respectively.

For mounting flare sheets 107, 109 and pickup 33 together for conjoint movement through a range of heights or vertical positions, mounting means 111 further comprises a pair of support arms 131, 135 pivotably mounted about the respective ends of pickup 33 for pivotal movement about an axis coaxial with reel 101. Support arm 131 is attached to flare sheet 107 by a plurality of bolts 137. Support arm 135 is similarly attached to flare sheet 109 by a plurality of bolts 139.

Pickup 33 and flare sheets 107, 109 are vertically adjusted via a crank mechanism 141. Mechanism 141 comprises a bell crank 143 pivotably mounted to frame 11 by pivot 145, a handle 147 for pivoting crank 143 about pivot 145, and a strap pivotably mounted between crank 143 and housing 105 for elevating and lowering pickup 33 and flare sheets 107, 109 responsive to pivoting of crank 143. Handle 147 includes a rod 149 rotatably supported in a bracket 151 and a linking member 153 into which rod 149 is threadably mounted for translation back and forth responsive to rotation of rod 149. Linking member 151 is pivotably mounted to bell crank 143 such that when member 153 is translated back and forth, crank 143 is pivoted back and forth about pivot 145.

IV. Operation of Pickup and Flare Sheets

In operation of the pickup 33 and flare sheets 107, 109, the crank mechanism 141 is used to move pickup 33 and flare sheet 107, 109 from an elevated position shown in FIG. 3 to a lowered position shown in FIG. 4. In the elevated position shown in FIG. 3, it is seen that guide 121 is slid all the way to the right in the slot 125 of slide 117. As pickup 33 is lowered, guide 121 pivots counterclockwise and slides to the left in the slot of guide 117. At the same time, pickup 33 is pivoting clockwise about pivot 113 and support arm 131 is pivoting counterclockwise about the end of pickup 33. Arm 131 maintains flare sheet 107 in a spaced location from pickup 33 so that no contact is made during the conjoint movement of flare sheet 107 and pickup 33. In FIG. 4 pickup 33 is in a lowered position with the guide 121 slide leftward in the slot of guide 117. Support arm 131 has pivoted counterclockwise about the end of pickup 33 permitting the left end of flare sheet 107 to move downwardly to a position close to the ground. The movement of support arm 155, flare sheet 109 and slide 119 is identical to and simultaneous with the movement of support arm 131, flare sheet 107 and slide 117.

It can be seen that in accordance with the design of mounting means 111, it is possible to move pickup 33 and flare sheets 107, 109 between an elevated position providing substantial clearance above the ground and a lowered position closely spaced above the ground. In addition, a wide range of heights are possible so that an optimum height for pickup 33 and flare sheets 107, 109 may be chosen dependent upon a wide variety of crop and field conditions. Still further, the flare sheets 107, 109 may be shaped and spaced relative to the ground so as to prevent light crops from being blown away by cross winds and to contain hard to feed crop therebetween until the reel teeth 103 are able to lift the crop and feed it into the bale forming chamber 29.

It will be appreciated by those skilled in the arts that the invention herein has been explained in connection with a preferred embodiment thereof. Other modifications and embodiments of the invention will be apparent to those skilled in the art. Accordingly, it is intended that the appended claims cover all such modifications and embodiments as are within the true spirit and scope of the invention.

We claim:

1. In a baler comprising:
   a frame including a pair of spaced sidewalls;
   a means for defining a bale-forming chamber for forming cylindrical bales, said chamber having a downwardly facing opening;
   a pickup pivotably mounted to said frame for movement through a range of vertical positions, transversely extending between said sidewalls and extending below said opening; and
   first and second flare sheets mounted on respective ends of said pickup;
   the improvement comprising means (1) mounting said pickup to said frame adjacent to the rear of said opening, (2) mounting each flare sheet to said frame adjacent to the front of said opening, and (3) pivotably mounting said flare sheets and pickup together between said front and rear of said opening for conjoint movement through said range of positions.

2. The baler of claim 1 wherein for each flare sheet said mounting means comprises (1) a slide fixed to said frame and having a slot formed therein and (2) a guide fixed to said flare sheet and slidably and pivotably mounted in said slot.

3. The baler of claim 2 wherein said mounting means further comprises (1) a pickup pivot fixed to said frame adjacent the rear of said opening and pivotably supporting one end of said pickup for movement through said range of positions and, (2) a flare sheet pivot fixed to said pickup and pivotably supporting one end of said flare sheet for conjoint movement with said pickup through said range of positions.

4. The baler of claim 3, 6 or 7 wherein:
   said chamber defining means comprises (1) a front and rear belt span extending generally upwardly when said chamber is empty and defining said opening at the lower extremities of said front and rear spans, and (2) a roller extending between said sidewalls, said rear belt span looped around said roller at the lower extremity of said rear span; and
   the pivotal axis of said pickup is coaxial with said roller.

5. In a baler comprising:
   a frame including a pair of spaced sidewalls;
   a means for defining a bale-forming chamber for forming cylindrical bales, said chamber having a downwardly facing opening;
   a pickup pivotably mounted to said frame for movement through a range of vertical positions, transversely extending between said sidewalls and extending below said opening; and
   first and second flare sheets mounted on respective ends of said pickup;
   the improvement comprising: pickup mounting means mounting said pickup to said frame adjacent to the rear of said opening;
   means mounting said flare sheets and pickup together for conjoint movement through said range of positions; and
   flare sheet mounting means for each flare sheet comprising (1) a slide fixed to said frame and having a slot formed therein and (2) a guide fixed to said flare sheet and slidably and pivotably mounted in said slot.

6. The baler of claim 5 wherein:

said pickup mounting means comprises a pickup pivot fixed to said frame adjacent the rear of said opening and pivotably supporting one end of said pickup for movement through said range of positions; and said means for mounting said flare sheets and pickup together comprises a flare sheet pivot fixed to said pickup and pivotably supporting one end of said flare sheet for conjoint movement with said pickup through said range of positions.

7. In a baler comprising:

a frame including a pair of spaced sidewalls;

a means for defining a bale-forming chamber for forming cylindrical bales, said chamber having a downwardly facing opening;

a pickup pivotably mounted to said frame for movement through a range of vertical positions, transversely extending between said sidewalls and extending below said opening; and first and second flare sheets mounted on respective ends of said pickup;

the improvement comprising:

a pickup pivot fixed to said frame adjacent the rear of said opening and pivotably supporting one end of said pickup for movement through said range of positions;

flare sheet mounting means mounting each flare sheet on said frame adjacent to the front of said opening; and a flare sheet pivot fixed to said pickup, located between said front and rear of said opening and pivotably supporting one end of said flare sheets for conjoint movement with said pickup through said range of positions.

* * * * *